US011870755B2

(12) United States Patent
Valluri et al.

(10) Patent No.: US 11,870,755 B2
(45) Date of Patent: *Jan. 9, 2024

(54) DYNAMIC INTENT-BASED FIREWALL

(71) Applicant: Cisco Technology, Inc., San Jose, CA (US)

(72) Inventors: Vamsidhar Valluri, Santa Clara, CA (US); Saravanan Radhakrishnan, Bangalore (IN); Anand Oswal, Pleasanton, CA (US); Vinay Prabhu, Milpitas, CA (US); Sarah Adelaide Evans, San Jose, CA (US); Suraj Rangaswamy, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 240 days.

This patent is subject to a terminal disclaimer.

(21) Appl. No.: 17/511,412

(22) Filed: Oct. 26, 2021

(65) Prior Publication Data

US 2022/0052984 A1 Feb. 17, 2022

Related U.S. Application Data

(63) Continuation of application No. 16/434,115, filed on Jun. 6, 2019, now Pat. No. 11,201,854.

(Continued)

(51) Int. Cl.
*H04L 12/46* (2006.01)
*H04L 9/40* (2022.01)
(Continued)

(52) U.S. Cl.
CPC ...... *H04L 63/0263* (2013.01); *H04L 12/4641* (2013.01); *H04L 45/02* (2013.01);
(Continued)

(58) Field of Classification Search
CPC . H04L 63/0263; H04L 12/4641; H04L 45/02; H04L 45/745; H04L 63/0218; H04L 63/0236; H04L 63/0272; H04L 63/20
See application file for complete search history.

(56) References Cited

U.S. PATENT DOCUMENTS 7,143,151 B1 11/2006 Kayashima et al.
8,316,435 B1 * 11/2012 Varadhan ................ H04L 45/60
726/2

(Continued)

FOREIGN PATENT DOCUMENTS

| JP | 2005505175 A | 2/2005 |
| JP | 2014503135 A | 2/2014 |
| JP | 2018506237 A | 3/2018 |

OTHER PUBLICATIONS

International Search Report and Written Opinion from the International Searching Authority, dated Mar. 12, 2020, 13 pages, for corresponding International Patent Application No. PCT/US2019/060910.

(Continued)

*Primary Examiner* — William G Trost, IV
*Assistant Examiner* — Adam A Cooney
(74) *Attorney, Agent, or Firm* — Polsinelli

(57) ABSTRACT

Systems and methods provide for provisioning a dynamic intent-based firewall. A network controller can generate a master route table for network segments reachable from edge network devices managed by the controller. The controller can receive zone definition information mapping the network segments into zones and Zone-based Firewall (ZFW) policies to apply to traffic between a source and destination zone specified by each ZFW policy. The controller can evaluate a ZFW policy to determine first edge network devices that can reach first network segments mapped to the source zone specified by the ZFW policy, (Continued)

second edge network devices that can reach second network segments mapped to the destination zone specified by the ZFW policy, and routing information (from the route table) between the first network segments, the first and second edge network devices, and the second network segments. The controller can transmit the routing information to the edge network devices.

20 Claims, 8 Drawing Sheets

Related U.S. Application Data

(60) Provisional application No. 62/774,103, filed on Nov. 30, 2018.

(51) Int. Cl.
  H04L 45/02 (2022.01)
  H04L 45/745 (2022.01)
(52) U.S. Cl.
  CPC ........ H04L 45/745 (2013.01); H04L 63/0218 (2013.01); H04L 63/0236 (2013.01); H04L 63/0272 (2013.01); H04L 63/20 (2013.01)

(56) References Cited

U.S. PATENT DOCUMENTS

| | | | |
|---|---|---|---|
| 9,369,431 B1* | 6/2016 | Kirby | ............. H04L 63/20 |
| 9,639,431 B2 | 5/2017 | Tracht et al. | |
| 2003/0065944 A1 | 4/2003 | Mao et al. | |
| 2010/0100616 A1 | 4/2010 | Bryson et al. | |
| 2013/0019277 A1* | 1/2013 | Chang | ......... H04L 63/0227 |
| | | | 726/1 |
| 2013/0074177 A1 | 3/2013 | Varadhan et al. | |
| 2013/0142203 A1 | 6/2013 | Koponen et al. | |
| 2014/0337500 A1* | 11/2014 | Lee | ........... H04L 41/122 |
| | | | 709/223 |
| 2016/0205071 A1 | 7/2016 | Cooper et al. | |
| 2016/0373310 A1* | 12/2016 | Banikazemi | ..... H04L 41/0806 |

OTHER PUBLICATIONS

Cisco: "Zone-Based Policy Firewall Design and Application Guide", Dec. 27, 2010, Document ID: 98628, 53 pages, available at https://www.cisco.com/c/en/us/support/docs/security/ios-firewall/98628-zone-design-guide.html.
Ranathunga, Dinesha, et al., "Case Studies of SCADA Firewall Configurations and the Implications for Best Practices," IEEE Transactions of Network and Service Management, vol. 13, No. 4, Dec. 2016, pp. 871-884.
Office Action—Notice of Intention to Grant for Japanese Application No. 2021521411, dated Jul. 28, 2023, 3 Pages.

\* cited by examiner

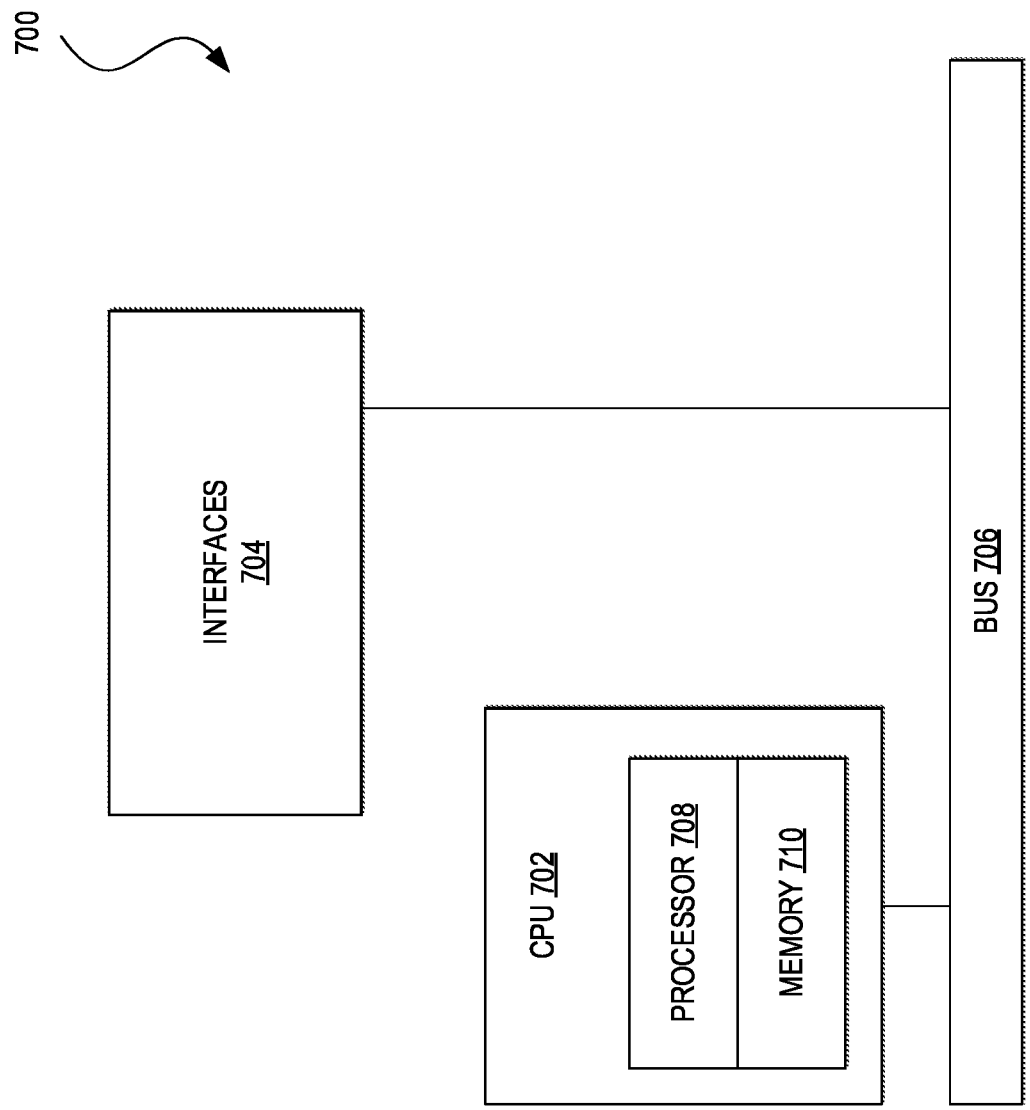

DYNAMIC INTENT-BASED FIREWALL

CROSS-REFERENCE TO RELATED APPLICATIONS

This application is a continuation of U.S. Non-Provisional patent application Ser. No. 16/434,115, filed on Jun. 6, 2019, which claims the benefit of U.S. Provisional Patent Application No. 62/774,103, filed on Nov. 30, 2018, the full disclosure of each is incorporated herein by reference in its entirety.

TECHNICAL FIELD

The subject matter of this disclosure relates in general to the field of computer networking, and more particularly, to systems and methods for provisioning a dynamic intent-based firewall.

BACKGROUND

A stateful firewall is a network security feature that can track the operating states and characteristics of certain network connections or sessions (e.g., Transmission Control Protocol (TCP), User Datagram Protocol (UDP), Internet Control Message Protocol (ICMP), etc.) traversing the firewall. The stateful firewall can establish a barrier between network segments, permit initiation of a connection or session from one segment, and only allow in those packets matching a known active connection or session from the other segment. Historically, stateful firewalls were configured using a Context-Based Access Control (CBAC) model in which a set of rules for network connectivity (e.g., an Access Control List (ACL)) was applied to a specific interface of a network device (e.g., switch, router, etc.) to allow traffic to originate from hosts (also referred to as computing devices, computing systems, endpoints, and so on, and can include servers, services, clients, and so forth) on one side of the firewall and to create temporary ACL entries to allow return traffic from hosts on the other side of the firewall. Implementing a CBAC firewall would require an administrator or other user to configure the firewall on a per interface basis, which can quickly become unmanageable as the number of interfaces on an individual network device and the number of network devices in a network increase. In addition, under CBAC, all traffic passing through a particular interface must receive the same treatment or inspection policy. This can decrease security by preventing traffic from being handled differently depending on the origination and direction of the traffic.

Zone-Based Firewalls (ZFWs) improve upon CBAC firewalls by using a more flexible, more easily understood zone-based model in which interfaces can be assigned to zones, and an inspection policy can be applied to traffic moving between the zones. Inter-zone policies can offer greater flexibility and granularity than CBAC firewall policies, and enable different inspection policies to be applied to multiple groups of hosts that are connected to the same interface. For example, a network operator can define a private zone comprising the set of interfaces that route traffic towards the interior of an organization's network, a Demilitarized Zone (DMZ) comprising the set of interfaces that route traffic toward the organization's public-facing hosts (e.g., web, mail, File Transfer Protocol (FTP) servers, etc.), a public zone comprising the set of interfaces that route traffic to the Internet, and zone-pair policies, such as a policies that allow traffic to flow freely in either direction between the public zone (i.e., the interfaces connected to the Internet) and the DMZ (i.e., the interfaces connected to the organization's public-facing hosts) and the DMZ and the private zone (i.e., the interfaces connected to the organization's private hosts) but only permit flows initiated from the private zone to the public zone and return flows from the public zone to the private zone.

ZFWs can also provide more security than CBAC firewalls because the latter depend on a blacklist security model that allows all traffic through an interface by default unless an ACL is explicitly defined to block traffic while ZFWs can implement a whitelist model for inter-zone traffic that denies all traffic by default unless a policy is explicitly defined to allow traffic. CBAC firewalls also require a large number of configuration commands (e.g., multiple ACLs and inspection actions) to be entered onto each interface one-by-one, making configuration time consuming even for minor policy changes. A ZFW allows multiple interfaces to share a single set of policies, and can reduce the number of commands needed to establish a firewall and simplify network configuration.

BRIEF DESCRIPTION OF THE FIGURES

To provide a more complete understanding of the present disclosure and features and advantages thereof, reference is made to the following description, taken in conjunction with the accompanying drawings, in which:

FIG. 6 illustrates a flow diagram of an example of a process for

FIG. 7 illustrates a block diagram of an example of a network device in accordance with an embodiment.

DESCRIPTION OF EXAMPLE EMBODIMENTS

Figure 1:
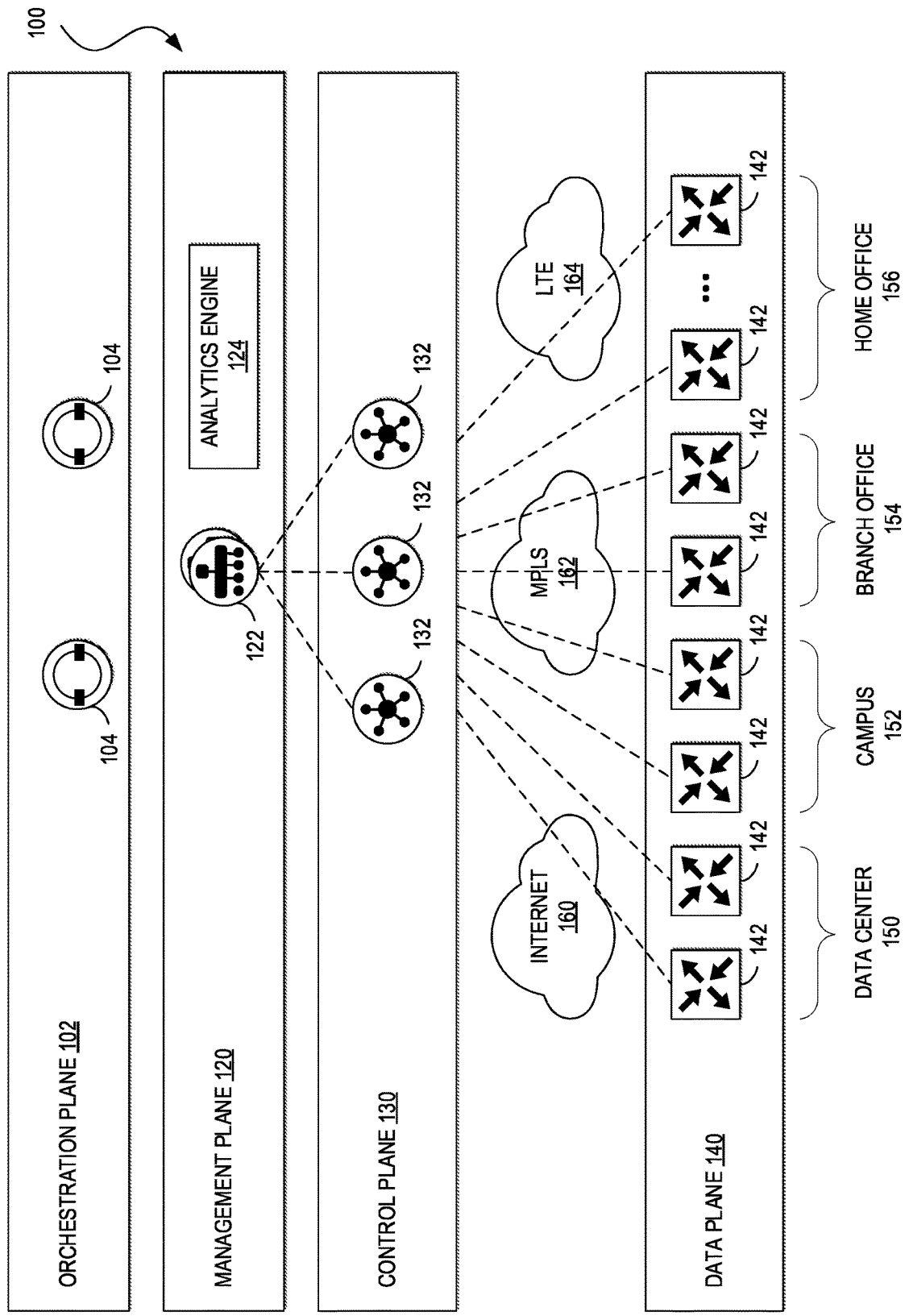
FIG. 1 illustrates a block diagram of an example of a network architecture in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for provisioning a dynamic intent-based firewall over a Wide-Area Network (WAN). A network controller can generate a master route table for a plurality of network segments reachable from a plurality of edge network devices managed by the network controller. The network controller can receive zone definition information mapping the plurality of network segments into one or more zones, and one or more Zone-based Firewall (ZFW) policies to apply to traffic between a source zone and a destination zone specified by each ZFW policy. The network controller can evaluate a first ZFW policy to determine one or more first edge network devices that can reach one or more first network segments mapped to a first source zone specified by the first ZFW policy, one or more second edge network devices that can reach one or more second network segments mapped to a first destination zone specified by the first ZFW policy, and first routing information, from the master route table, between the one or more first network segments, the one or more first edge network devices, the one or more second edge network devices, and the one or more second network segments. The network controller can transmit the first routing information to the one or more first edge network devices and the one or more second edge network devices.

Example Embodiments

Although ZFWs can offer greater flexibility, security, and ease of configuration than CBAC firewalls, conventional ZFWs impose certain restrictions, such as binding the definition of zones to interfaces, allowing all traffic to flow by default among interfaces that are members of the same zone, and requiring duplicative configuration for traffic traversing multiple edge network devices, among other drawbacks. These requirements can make it difficult to implement conventional ZFWs in network deployments that host multiple services or client groups behind a single interface. In addition, conventional ZFWs require configuration that can obfuscate a network operator's intent, operate in both an overly restrictive manner (e.g., binding the definition of zones to interfaces) and overly permissive manner (e.g., allowing all traffic between interfaces in the same zone), and lack dynamicity (e.g., requiring zone behavior to be defined at the outset of configuration) and mobility (e.g., requiring policy re-configuration upon moving a host from one network segment to another).

For example, a network may include a first edge network device with an interface to a subnet hosting printer and email services and that is connected over a Wide Area Network (WAN) (e.g., the Internet) to a second edge network device with an interface to an office subnet and another interface to a guest subnet. A network operator may want to permit all subnets on the second edge network device (e.g., the office and guest subnets) to initiate traffic to the printer service but prohibit the guest network from accessing the email service. To accomplish these objectives using conventional ZFW policies, a network administrator must distinguish logically between printing and email services and define conventional ZFW policies matching on specific source and destination Internet Protocol (IP) addresses. In particular, the network operator may define a first conventional zone consisting of the interface of the first edge network device to the printer and email services, a second conventional zone consisting of the interface of the second edge network device to the office subnet, and a third conventional zone consisting of the interface on the second edge network device to the guest subnet. There may be one or more additional conventional zones consisting of the interfaces connecting the first and second edge network devices over the WAN.

In addition, the administrator may be required to define a first set of conventional ZFW policies in the second edge network device. For example, to enable the office and guest subnets to initiate traffic to the printer service and prohibit the guest subnet from accessing the email service, the administrator may configure the second edge network device with these policies:

A first conventional ZFW policy to inspect traffic whose source address corresponds to the printer service's IP addresses (e.g., match on source-ip<printer IP addresses>; and A second conventional ZFW policy to inspect traffic whose source address corresponds to the office subnet and whose destination corresponds to the email subnet (e.g., match on source-subnet <office subnet> AND dest-subnet email, inspect).

The inspect action can refer to the second edge network device implementing state-based control of certain traffic (e.g., TCP, UDP, ICMP, etc.). For example, the first conventional ZFW policy may cause the second edge network device to allow traffic egressing interfaces corresponding to the IP addresses of the printer service and store state information for the traffic to allow return traffic. In addition, the second edge network device can process the packet headers of traffic ingressing the interfaces corresponding to the IP addresses of the printer service to ensure that there is an existing connection or session that initiated the traffic. If the packet headers indicate that the source address of the traffic corresponds to the IP addresses of the printer service and a connection or session exists for the traffic, then the second edge network device may allow the traffic. The second conventional ZFW policy can cause the second edge network device to process the packet headers of traffic ingressing an interface corresponding to the office subnet and egressing an interface corresponding to the email subnet. If the packet headers of the traffic indicate that the source address corresponds to the office subnet and the destination address corresponds to the email subnet, the second edge network device may allow the traffic and store state information for the traffic to allow return traffic.

The conventional ZFW policy model requiring an administrator to define policies based on IP addresses or subnets on certain interfaces of the second edge network device can make it difficult to understand the network operator's original intent to allow any subnets on the second edge network device to access the printer service and prohibit the guest subnet from accessing the email service. The conventional ZFW policy model can further complicate and obfuscate intent because the administrator must also complement the first set of policies by configuring the first edge network device with a second set of policies:

A third conventional ZFW policy to pass traffic whose destination corresponds to the office subnet and whose source corresponds to the email subnet (e.g., match on dest-subnet <office subnet> AND source-subnet email, pass); and A fourth conventional ZFW policy to pass traffic whose destination corresponds to the office and guest subnets and whose source corresponds to the printer subnet (e.g., match on dest-subnet <office and guest subnets> AND source-subnet printer, pass).

The pass action can refer to the first edge network device permitting traffic corresponding to the match conditions without having to process the packet headers of the traffic. For example, the third conventional ZFW policy may cause the first edge network device to permit traffic egressing an interface corresponding to the office network if the traffic ingressed an interface corresponding to the email service. The fourth conventional ZFW policy may cause the first edge network device to permit traffic egressing interfaces corresponding to the office or guest subnets if the traffic ingressed an interface corresponding to the printer subnet. Here, the second set of policies effectively mirrors the first set of policies to enforce ZFW policy for traffic flowing across multiple edge network devices. Mirror configurations can make defining policies highly complex and difficult to troubleshoot in a typical enterprise network, which can have a number of network objects (e.g., routers, switches, segments, interfaces, hosts, etc.) that is many orders of magnitude greater than the above example. Mirror configuration can also generate unnecessary load on the network because policy must be processed multiple times when the traffic traverses the multiple edge network devices, at least once at the interface facing the sender and again at the interface facing the destination. Moreover, if a host is added to or moved from a network segment, every network device that communicates with that host must be updated. The complexity of configuration, increased load on the network, and inflexibility of conventional ZFWs are consequences of conventional ZFW policies that must be configured on a per network device basis by a network operator and conventional zones that are restricted to interfaces or network segments restricted to interfaces (e.g., interface-binded subnets, Virtual Local Area Networks (VLANs), Virtual Extensible Local Area Network (VXLAN)/Network Virtualization using Generic Routing Encapsulation (NVGRE) virtual networks, Virtual Routing and Forwarding instances (VRFs), Virtual Private Networks (VPNs), Cisco ACI™ Endpoint Groups (EPGs), or other network segmentation technology). Although some conventional zones enable multiple interfaces to share a single set of conventional ZFW policies, the conventional ZFW policy model still requires the network operator to configure network devices one-by-one. And although some conventional ZFWs allow zones to be defined as subnets, VLANs, Virtual Network Identifiers (VNIDs), VRFs, VPNs, EPGs, or other network segmentation technology, these network segments are binded to specific interfaces. For the network operator, the difficulties and limitations of conventional ZFWs can be frustrating and result in human error leading to compromised network security.

Various embodiments of the present disclosure may overcome the above and other deficiencies of the prior art by enabling a ZFW to be configured by an administrator or other user from a single, centralized network management system or network controller and decoupling the definition of zones from network interfaces. Thus, zones do not require configuration on a per device basis and need not be limited to interfaces or interface-binded network segments. Zones may instead be defined based on intent, such as zones defined by route attributes (e.g., route origin, site identifier, tag, etc.), packet header attributes (source address, source port, destination address, destination port, protocol, Differentiated Service Code Point (DSCP), etc.), packet payload attributes (e.g., application and other attributes that can obtained via Deep Packet Inspection (DPI)), identity-based attributes (e.g., user identity, group, role, etc.), virtual network segments (e.g., VLANs, VNIDs, VRFs, VPNs, EPGs, etc.), location or network site identifier (e.g., campus, data center, branch, etc.), or other collections of network objects (e.g., users, devices, systems, applications, etc.). For example, a network operator can customize a zone-based policy model by defining zones comprising any collection of network objects, default behavior for the custom-defined zones (e.g., prohibiting services from accessing other services, prohibiting network objects directly connected to the Internet from initiating communications with clients or services, etc.), and a matrix of allowed communications that can override the default behavior. This can significantly reduce the complexity of configuration and the amount of configuration that must be performed by an administrator or other user.

Centrally applied ZFW policies decoupled from interfaces can also support dynamic and mobile policy updates. For example, an administrator can define a "partner" zone at the outset of network provisioning but need not set the conditions for membership in the partner zone and partner zone behavior until a member of the partner zone attaches to the network. Moreover, adding or removing clients and services to or from network segments would not require reconfiguration of policy. An additional advantage is that network devices can conserve processing, memory, bandwidth, and other resources by not having to enforce ZFW policies that are not applicable to those network devices.

Centrally applied ZFW policies decoupled from interfaces can also eliminate mirror configuration and associated scalability issues. For example, the centralized network management system or controller can determine routing information throughout a network, update the routing information in accordance with the ZFW policies, and tag routes as belonging to a particular zone for distribution to specific edge network devices and thereby eliminate the need for mirrored ZFW policies. Numerous other functions and advantages are described and suggested below as may be provided in accordance with the various embodiments.

In some embodiments, a network controller can generate a master route table for a plurality of network segments reachable from a plurality of edge network devices managed by the network controller. The network controller can receive zone definition information mapping the plurality of network segments into one or more zones, and one or more ZFW policies to apply to traffic between a source zone and a destination zone specified by each ZFW policy. The network controller can evaluate a first ZFW policy to determine one or more first edge network devices that can reach one or more first network segments mapped to a first source zone specified by the first ZFW policy, one or more second edge network devices that can reach one or more second network segments mapped to a first destination zone specified by the first ZFW policy, and first routing information, from the master route table, between the one or more first network segments, the one or more first edge network devices, the one or more second edge network devices, and the one or more second network segments. The network controller can transmit the first routing information to the one or more first edge network devices and the one or more second edge network devices.

In some embodiments, the first ZFW policy can include an inspect action and the network controller can determine second routing information, from the master route table, between the one or more second network segments, the one or more second edge network devices, the one or more first edge network devices, and the one or more first network segments. The network controller can transmit the second routing information to the one or more second edge network devices and the one or more first edge network devices in response to receiving traffic whose source corresponds to the one or more first network segments and whose destination corresponds to the one or more second network segments.

In some embodiments, the plurality of network segments can comprise a plurality of Virtual Private Networks (VPNs), the zone definition information can comprise information mapping the plurality of VPNs into the one or more zones, and each zone can be unbinded to interfaces of the plurality of edge network devices. In other embodiments, the plurality of network segments can comprise at least one of a plurality of network objects sharing route attributes, a plurality of network objects sharing packet header attributes, a plurality of network objects sharing packet payload attributes, a plurality of network objects sharing identity information, a plurality of Virtual Local Area Networks (VLANs), a plurality of Virtual Network Identifiers (VNIDs), a plurality of Virtual Routing and Forwarding instances (VRFs), a plurality of Endpoint Groups (EPGs), or a plurality of network objects sharing a location or network site identifier; the zone definition information can comprise information mapping at least one of the plurality of network objects sharing route attributes, the plurality of network objects sharing packet header attributes, the plurality of network objects sharing packet payload attributes, the plurality of network objects sharing identify information, the plurality of VLANs, the plurality of VNIDs, the plurality of VRFs, the plurality of EPGs, or the plurality of network objects sharing location or network site identifier information into the one or more zones; and each zone can be unbinded to interfaces of the plurality of edge network devices.

In some embodiments, no network segment mapped to a third zone may be reachable at a first time from the one or more first edge network devices, and the one or more first edge network devices may exclude second routing information between any network segment mapped to the third zone and the one or more first edge network devices. The network controller can determine that one or more third network segments mapped to the third zone are reachable from the one or more first edge network devices at a second time. The network controller can update the master route table with second routing information between the one or more third network segments and the one or more first edge network devices. The network controller can evaluate a second ZFW policy to determine the one or more first edge network devices can reach the one or more third network segments and the third zone is a second source zone specified by the second ZFW policy, one or more third edge network devices that can reach one or more fourth network segments mapped to a second destination zone specified by the second ZFW policy, and third routing information, from the master route table, between the one or more third network segments, the one or more first edge network devices, the one or more third edge network devices, and the one or more fourth network segments. The network controller can transmit the third routing information to the one or more first edge network devices and the one or more third edge network devices.

In some embodiments, the network controller can determine the one or more first network segments are no longer reachable from the one or more first edge network devices. The network controller can remove the first routing information from the one or more first edge network devices. The network controller can determine the one or more first network segments are reachable from one or more third edge network devices. The network controller can update the master route table with second routing information between the one or more first network segments, the one or more third edge network devices, the one or more second edge network devices, and the one or more second network segments. The network controller can evaluate the first ZFW policy to determine the one or more third edge network devices can reach the one or more first network segments, the one or more second edge network devices, and the second routing information. The network controller can transmit the second routing information to the one or more third edge network devices and the one or more second edge network devices.

In some embodiments, the network controller can receive one or more updates to at least one of the zone definition information or the one or more ZFW policies. The network controller can determine that at least one first route of the first routing information is no longer available based on the one or more updates. The network controller can remove the first route from the one or more first edge network devices.

In some embodiments, the network controller can determine one or more source prefixes corresponding to one or more source match conditions specified by the first ZFW policy. The network controller can determine one or more destination prefixes corresponding to one or more destination match conditions specified by the first ZFW policy. The network controller can retrieve the first routing information from the master route table based on the one or more source prefixes and the one or more destination prefixes. The network controller can retrieve second routing information from the master route table based on the one or more destination prefixes and the one or more source prefixes. The network controller can transmit the second routing information to the one or more second edge network devices and the one or more first edge network devices in response to receiving traffic whose source corresponds to the source prefixes and whose destination corresponds to the one or more destination prefixes.

In some embodiments, the network controller can determining one or more source prefixes corresponding to one or more default source match conditions of the first ZFW policy. The network controller can determine one or more destination prefixes corresponding to one or more default destination match conditions of the first ZFW policy. The network controller can retrieve the first routing information from the master route table based on the one or more source prefixes and the one or more destination prefixes FIG. 1 illustrates an example of a network architecture 100 for implementing aspects of the present technology. An example of an implementation of the network architecture 100 is the Cisco® Software Defined Wide Area Network (SD-WAN) architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliances 104 can perform the initial authentication of the edge network devices 142 and orchestrate connectivity between devices of the control plane 130 and the data plane 140. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 120 can be responsible for central configuration and monitoring of a network. The management plane 120 can include one or more physical or virtual network management appliances 122. The network management appliances 122 can provide centralized management of the network via a graphical user interface to enable a user to monitor, configure, and maintain the edge network devices 142 and links (e.g., Internet transport network 160, Multi-Protocol Label Switching (MPLS) network 162, 4G/LTE network 164) in an underlay and overlay network. The network management appliances 122 can support multi-tenancy and enable centralized management of logically isolated networks associated with different entities (e.g., enterprises, divisions within enterprises, groups within divisions, etc.). Alternatively or in addition, the network management appliances 122 can be a dedicated network management system for a single entity. In some embodiments, physical or virtual Cisco® SD-WAN vManage appliances can operate as the network management appliances 122.

The management plane 120 can also include an analytics engine 124 for providing visibility into the performance of applications and the network over time, such as the best and worst performing applications, the most bandwidth consuming applications, anomalous applications families (e.g., applications whose bandwidth consumption change over a period of time), network availability and circuit availability, carrier health, best and worst performing tunnels, and so forth. The analytics engine 124 may include a user interface that can generate graphical representations of an overlay network and enable users to drill down to display the characteristics of a single carrier, tunnel, or application at a particular time. The user interface can serve as an interactive overview of the network and an entrance point for more details. In some embodiments, the user interface can display information for the last 24 hours and enable a user to drill down to select different time periods for different data sets to display. The user interface can also display data for network availability, WAN performance by carrier, and applications, among other network analytics.

In some embodiments, the analytics engine 124 can provide application performance with a Virtual Quality of Experience (vQoE) value, which can be customized for individual applications. This value can range from zero to ten, with zero being the worst performance and ten being the best. The analytics engine can calculate vQoE based on latency, loss, and jitter, and customize the calculation for each application.

The analytics engine 124 can offer insight into planning the WAN and into its operational aspects, from historical performance, to forecasting, to providing recommendations for optimizing the WAN. The analytics engine 124 can store months of data, apply machine learning algorithms, and provide unique insights and recommendations. For example, the analytics engine 124 can offer forecasting recommendations to plan for sites that may need additional bandwidth in the next three to six months; what-if scenarios to help identify opportunities for balancing cost, performance, and availability of networks and applications; application-aware routing policies based on historical information to fine tune the WAN; recommended network service providers for a specific location; and so forth.

The control plane 130 can build and maintain a network topology and make decisions on where traffic flows. The control plane 130 can include one or more physical or virtual network controller appliances 132. The network controller appliances 132 can establish secure connections to each edge network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliances 132 can operate as route reflectors. The network controller appliances 132 can also orchestrate secure connectivity in the data plane 140 between and among the edge network devices 142. For example, in some embodiments, the network controller appliances 132 can distribute crypto key information among the edge network devices 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliances 132.

The data plane 140 can be responsible for forwarding packets based on decisions from the control plane 130. The data plane 140 can include the edge network devices 142, which can be physical or virtual network devices. The edge network devices 142 can operate at the edges of various network sites associated with an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
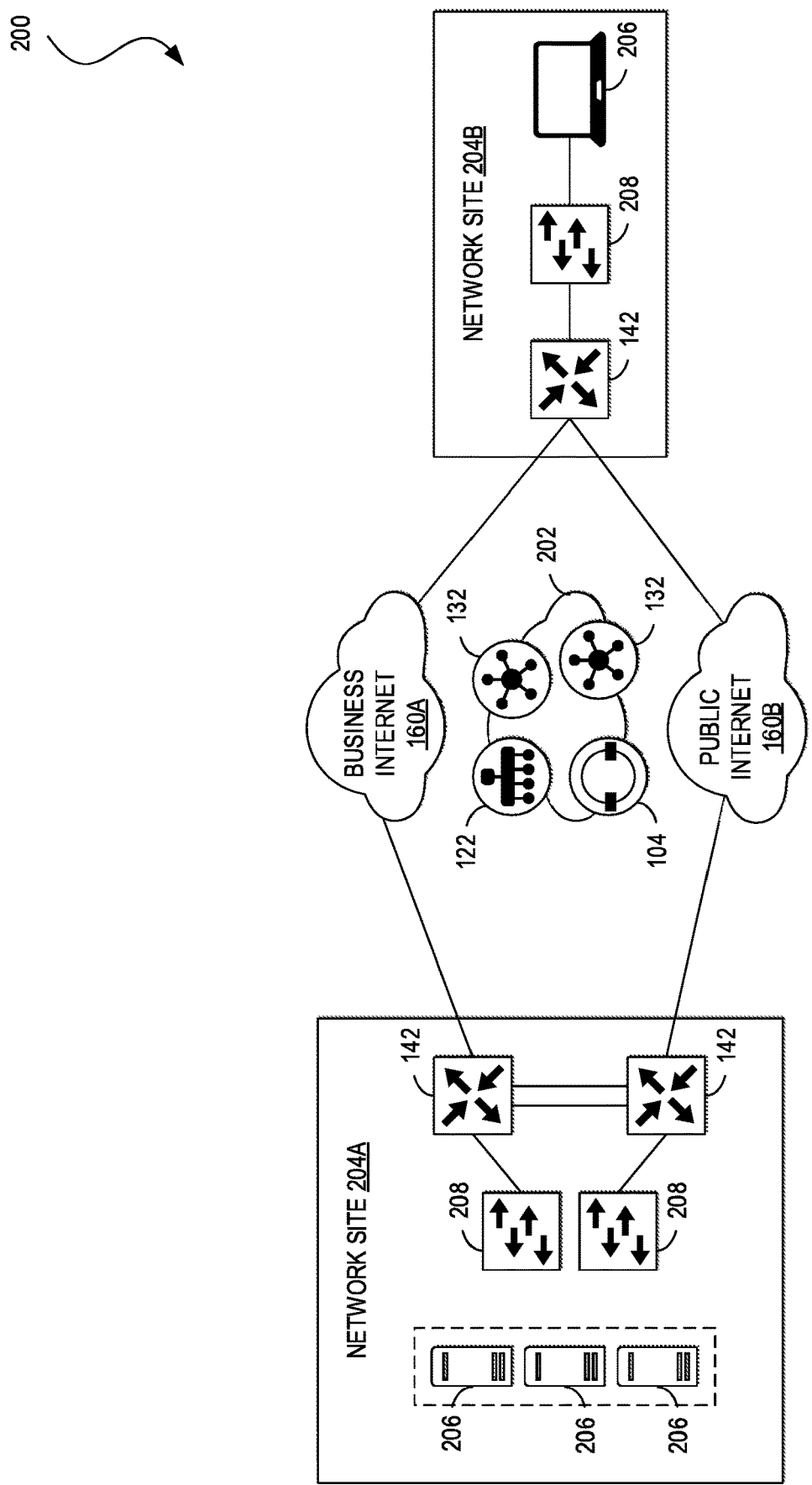
FIG. 2 illustrates a block diagram of an example of a network environment in accordance with an embodiment.

FIG. 2 illustrates an example of a network environment 200 for showing various aspects of the network architecture 100. The network environment 200 can include a management network 202, a pair of network sites 204A and 204B (collectively, 204) (e.g., the data centers 150, the campus networks 152, the branch office networks 154, the home office networks 156, cloud service provider networks, etc.), and a pair of Internet transport networks 160A and 160B (collectively, 160). The management network 202 can include one or more network orchestrator appliances 104, one or more network management appliances 122, and one or more network controller appliances 132. Although the management network 202 is shown as a single network in this example, one of ordinary skill in the art will understand that each object of the management network 202 can be distributed across any number of networks and/or be co-located with the sites 204. In this example, each object of the management network 202 can be reached through either transport network 160A or 160B.

Each site can include one or more endpoints 206 connected to one or more access network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The access network devices 208 can include physical or virtual switches, routers, and other network devices. Although the site 204A is shown including a pair of access network devices and the site 204B is shown including a single access network device in this example, the access network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The access network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network environment 200 can utilize a color called "biz-internet" for the Internet transport network 160A and a color called "public-internet" for the Internet transport network 160B.

In some embodiments, each edge network device 142 can form a Datagram Transport Layer Security (DTLS) or TLS control connection with at least one of the network controller appliances 132 and connect to any network controller appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
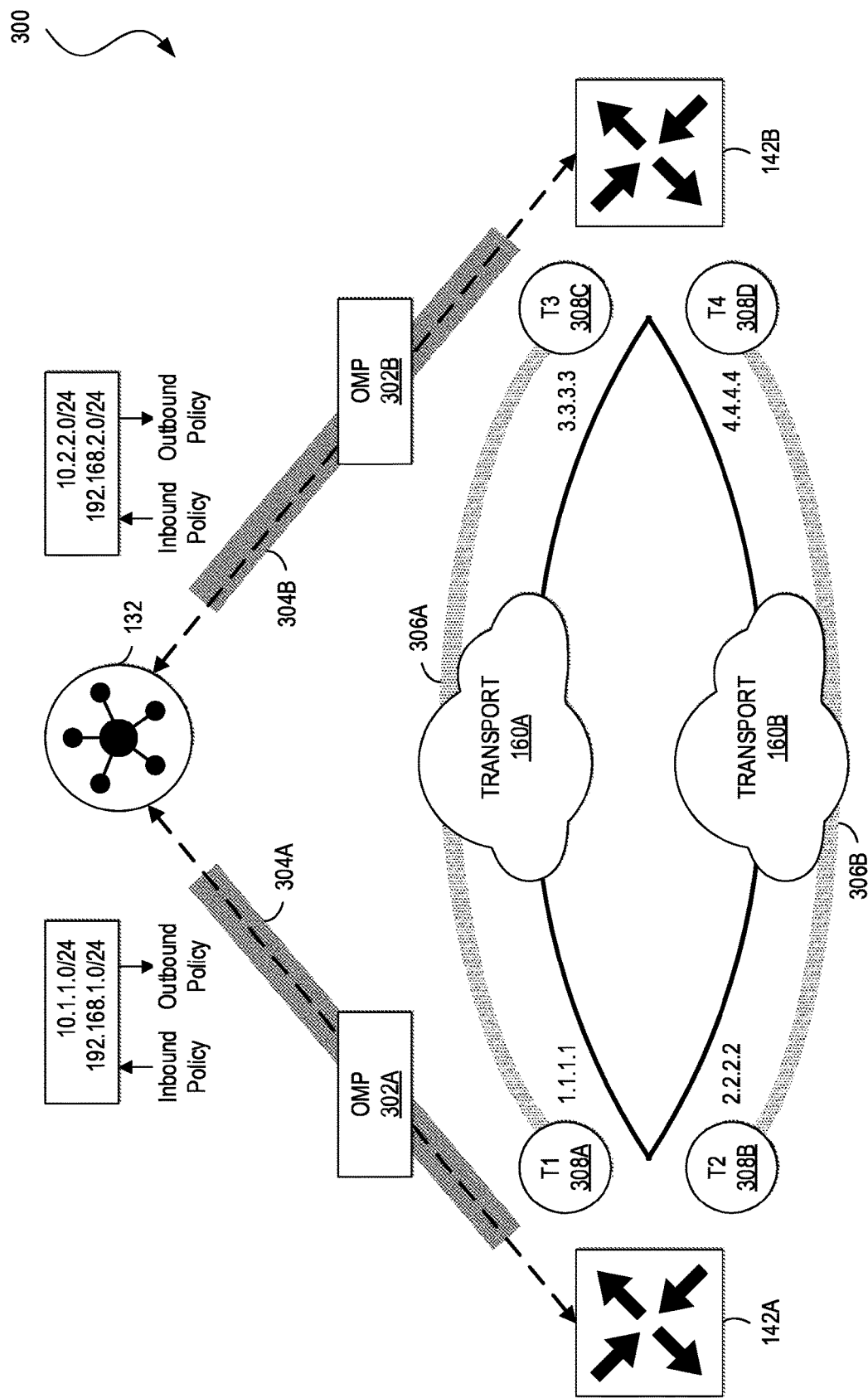
FIG. 3 illustrates a block diagram of an example of an approach for managing an overlay network in accordance with an embodiment.

FIG. 3 illustrates a block diagram 300 of an example approach for managing an overlay network, such as via OMP. In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:
  OMP routes, which can correspond to prefixes that are learned from the local site, or service side, of the edge network device 142. The prefixes can be originated as static or connected routes, or from within a routing protocol (e.g., BGP, OSPF, etc.), and redistributed into OMP so they can be carried across the overlay. OMP routes can advertise attributes such as transport location (TLOC) information (which can similar to a BGP next-hop IP address) and other attributes such as origin, originator, preference, site identifier, tag, and VPN identifier. An OMP route may be installed in the forwarding table if the TLOC to which it points is active.
  TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, Intrusion Prevent System (IPS), Intrusion Detection Systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the block diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

In some embodiments, network-wide segmentation can be implemented by defining groupings of network objects (e.g., subnets, VLANs, VNIDs, VRFs, VPNs, EPGs, etc.) at the edges of the network (e.g., the edge network devices 142), and carrying segmentation information in the packets for intermediate nodes to handle. For example, the edge network device 142A can subscribe to two VPNs, a "red" VPN corresponding to the prefix 10.1.1.0/24 (e.g., either directly through a connected interface or learned via Internal Gateway Protocol (IGP) or Border Gateway Protocol (BGP)), and a "blue" VPN corresponding to the prefix 10.2.2.0/24. The edge network device 142B can likewise subscribe to two VPNs, the red VPN, corresponding to the prefix 192.168.1.0/24, and the blue VPN, corresponding to the prefix 192.168.2.0/24 (either directly through a connected interface or learned via IGP or BGP).

Because the edge network devices 142 have the OMP connections 302 over the TLS tunnels 304 to the network controller appliance 132, they can propagate their routing information to the network controller appliance 132. On the network controller appliance 132, a network administrator can enforce policies to drop routes, to change TLOCs (which can be overlay next hops) for traffic engineering or service chaining, or to change the VPN identifier. The network administrator can apply these policies as inbound or outbound policies on the network controller appliance 132.

Prefixes belonging to a single VPN can be kept in a separate route table. This can provide Layer 3 isolation for the various segments in the network. Thus, the edge network devices 142 can each have two VPN route tables. In addition, the network controller appliance 132 can maintain the VPN context of each prefix. Separate route tables can provide isolation on a single node. In some embodiments, VPN identifiers can be used to propagate routing information across the network. A VPN identifier carried in a packet can identify each VPN on a link. When a VPN is configured on a particular edge network device, the VPN can have a link color or label associated with it. The edge network device can send the link color or label, along with the VPN identifier, to the network controller appliance 132. The network controller appliance 132 can propagate information mapping the edge network device to the VPN identifier to other edge network devices in the network. Remote edge network devices can then use the link color or label to send traffic to the appropriate VPN. Local edge network devices, on receiving the data with the VPN identifier link color or label, can use the link color or label to demultiplex the data traffic. In this example, the transport networks 160 that connect the edge network devices 142 can be unaware of the VPNs, the edge network devices 142 may know about VPNs, and the rest of the network can follow standard routing.

In some embodiments, policy can be used to influence the flow of traffic among the edge network devices 142. Policy can be characterized as centralized or local. Centralized policy can be provisioned on the network controller appliance 132, and localized policy can be provisioned on the edge network devices 142, which may sit at the network edge between a branch or enterprise site and a transport network, such as the Internet transport network 160, MPLS network 162, 4G/LTE network 164, and so forth.

Policy can also be characterized as control or routing policy, which may affect the flow of routing information in the network's control plane, or data policy, which may affect the flow of data traffic in the network's data plane. Centralized control policy can apply to the network-wide routing of traffic by affecting the information that is stored in the master route table of the network controller appliance 132 and that is advertised to the edge network devices 142. The effects of centralized control policy can be seen in how the edge network devices 142 direct traffic to its destination. The centralized control policy configuration itself can remain on the network controller appliance 132 and not be pushed to the edge network devices 142.

When no centralized control policy is provisioned, all OMP routes can be placed in the master route table of the network controller appliance 132, and the network controller appliance 132 can advertise all OMP routes to all of the edge network devices 142 in the same segment (e.g., subnet, VLAN, VNID, VRF, VPN, EPG, or other collection of hosts). By provisioning centralized control policy, an administrator or other user can affect which OMP routes are placed in the master route table of the network controller appliance 132, what route information is advertised to the edge network devices 142, and whether the OMP routes are modified before being put into the master route table or before being advertised.

When centralized control policy is provisioned, the network controller appliance 132 can redistribute route information to the edge network devices 142 or modify the route information that is stored in the master route table of the network controller appliance 132 or that is advertised by the network controller appliance 132. The network controller appliance 132 can activate the control policy by applying it to specific sites in the network in either the inbound or the outbound direction (with respect to the network controller appliance 132). Applying a centralized control policy in the inbound direction can filter or modify the routes being advertised by the edge network devices 142 before they are placed in the master route table on the network controller appliance 132. As the first step in the process, routes can be accepted or rejected. Accepted routes can be installed in the master route table on the network controller appliance 132 either as received or as modified by the control policy. Routes that are rejected by a control policy can be silently discarded.

Applying a control policy in the outbound direction can filter or modify the routes that the network controller appliance 132 redistributes to the edge network devices 142. As the first step of an outbound policy, routes can either be accepted or rejected. For accepted routes, centralized control policy can modify the routes before they are distributed by the network controller appliance 132. Routes that are rejected by an outbound policy are not advertised.

The edge network devices 142 can place route information learned from the network controller appliance 132 into their local route tables for use when forwarding data traffic. Because the network controller appliance 132 can operate as the centralized routing system in the network, the edge network devices 142 do not modify the OMP route information that they learn from the network controller appliance 132. The network controller appliance 132 can regularly receive OMP route advertisements from the edge network devices 142 and, after recalculating and updating the routing paths through the network, the network controller appliance 132 can advertise new routing information to the edge network devices 142.

The centralized control policy provisioned on the network controller appliance 132 can remain on the network controller appliance and not be downloaded to the edge network devices 142. However, the routing decisions that result from centralized control policy can be passed to the edge network devices 142 in the form of route advertisements, and so the effect of the control policy can be reflected in how the edge network devices 142 direct data traffic to its destination.

Localized control policy can be provisioned locally on the edge network devices 142. Localized control policy can be similar to the routing policies configured on a conventional router, such as how BGP and OSPF routing (or other routing protocol) behavior can be modified on a site-local network. Localized data policy can allow for provisioning and application of access lists to a specific interface or interfaces on the edge network devices 142. Simple access lists can permit and restrict access based on a 6-tuple match (e.g., source and destination IP addresses and ports, DSCP fields, and protocol), in the same way as with centralized data policy. Access lists can also allow provisioning of class of service (CoS), policing, and mirroring, which can control how data traffic flows out of and in to the interfaces and interface queues of the edge network devices 142.

Centralized data policy can apply to the flow of data traffic throughout the network. When no centralized data policy is provisioned, all prefixes within a particular network segment (e.g., subnet, VLAN, VNID, VRF, VPN, EPG, or other network segment technology) may be reachable from that segment. Provisioning centralized data policy can apply a 6-tuple filter that controls access between sources and destinations. As with centralized control policy, centralized data policy can be provisioned on the network controller appliance 132, and that configuration can remain on the network controller appliance 132. The effects of data policy can be reflected in how the edge network devices 142 direct data traffic to its destination. Unlike control policy, however, centralized data policies may be pushed to the edge network devices 142 in a read-only fashion.

In some embodiments, centralized data policies can be configured on the network controller appliance 132 using lists, policy definition (or policies), and policy application. Lists can define the targets of policy application or matching. Some examples of lists can include prefix lists (e.g., list of prefixes for use with policies), site lists (e.g., list of site identifiers for use in policy definitions and policy applications), TLOC lists (e.g., lists of TLOCs for use in policy definitions), and VPN lists (e.g., list of VPNs for use in policy) or lists of other network segments (e.g., subnets, VLANs, VNIDs, VRFs, EPGs, or other network segmentation technology). Policy definition (or policies) can control aspects of control and forwarding. Policy definition (or policies) can include different types of policies, such as control policies, data policies, and ZFW policies (e.g., policies defining zones and controlling traffic between zones). Policy application can control what a policy is applied towards. Policy application can be site-oriented, and can be defined by the site-list.

Figure 4:
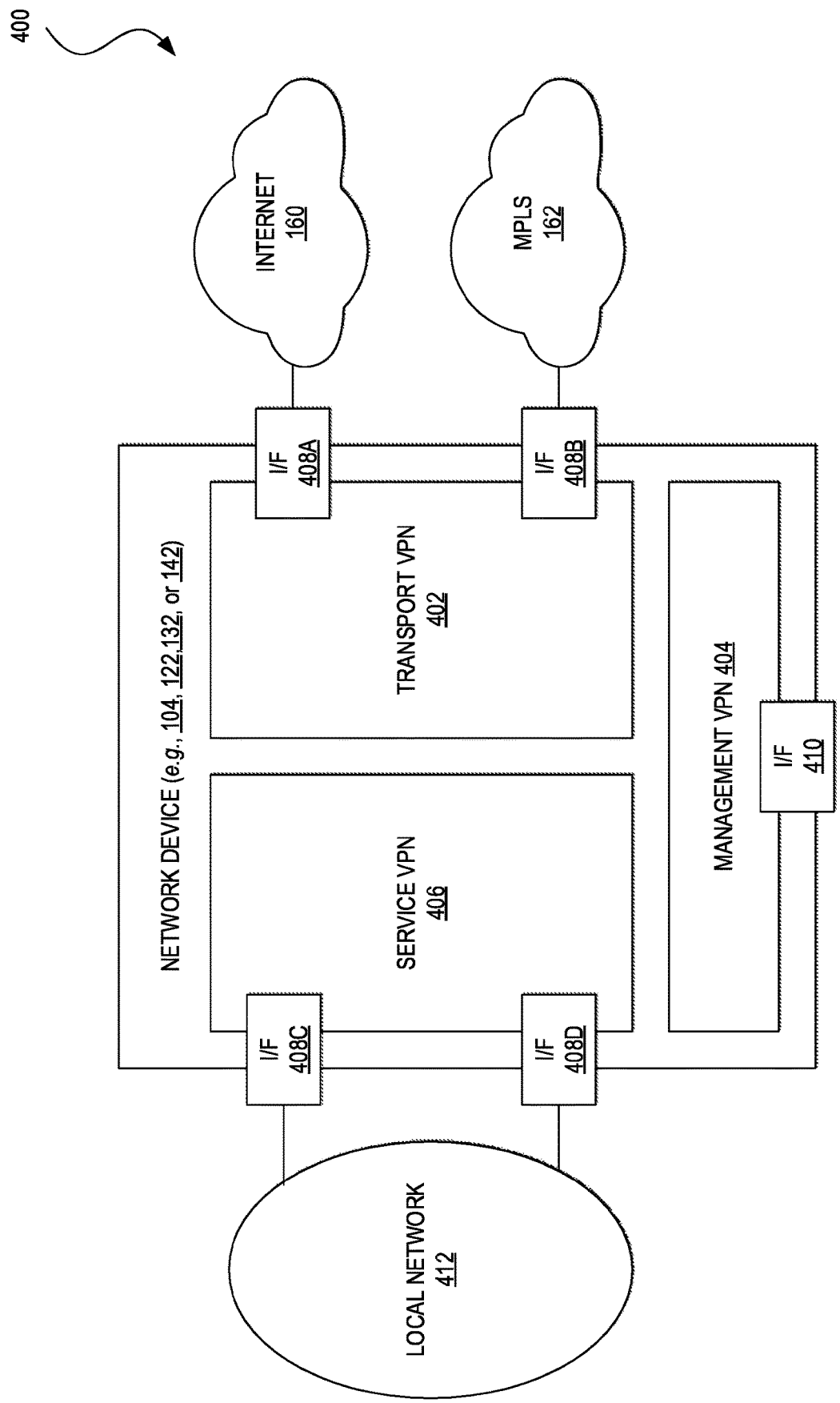
FIG. 4 illustrates a block diagram of an example of an approach for segmenting a network in accordance with an embodiment.

FIG. 4 illustrates a block diagram 400 of an example of an approach for segmenting a network using VPNs. VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, each edge network device 142 can include a transport VPN 402 (e.g., VPN number zero) and a management VPN 404 (e.g., VPN number five-hundred twelve). The transport VPN 402 can include one or more physical or virtual network interfaces (e.g., Gigabit Ethernet network interfaces 408A and 408B) that respectively connect to WAN transport networks (e.g., the Internet transport network 160 and the MPLS network 162). Secure DTLS/TLS connections to the network controller appliances 132 or between the network controller appliances 132 and the network orchestrator appliances 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliances 104, network management appliances 122, network controller appliances 132, and/or edge network devices 142 over a management network interface 410. In some embodiments, the management VPN 404 may not be carried across the overlay network.

In addition to the transport VPN 402 and the management VPN 404, each edge network device 142 can also include one or more other service VPNs 406. The service VPN 406 can include one or more physical or virtual network interfaces (e.g., Gigabit Ethernet network interfaces 408C and 408D) that connect to one or more local-site networks 412 and carry data traffic. The service VPN 406 can be configured to provide features such as OSPF or BGP, Virtual Router Redundancy Protocol (VRRP), QoS, traffic shaping, policing, and so forth. In some embodiments, data traffic can be directed over IPSec tunnels to other sites by redistributing OMP routes received from the network controller appliances 132 at the site 412 into the routing protocol configured for the service VPN 406. In turn, routes from the local site 412 can be advertised to other sites by advertising the service VPN routes into the OMP routing protocol, which can be sent to the network controller appliances 132 and redistributed to other edge network devices 142 in the network.

Figure 5:
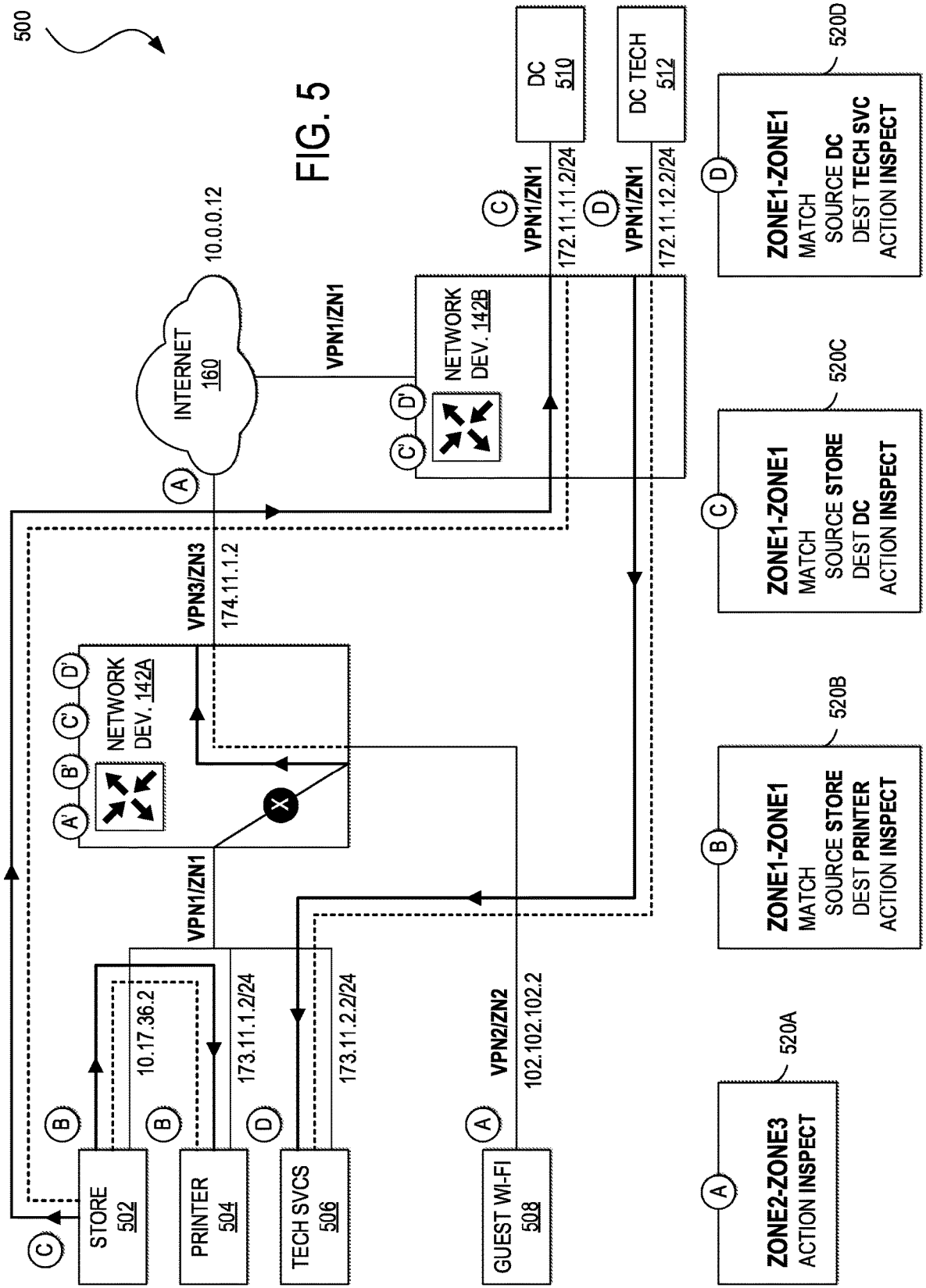
FIG. 5 illustrates a block diagram of an example of a network environment in accordance with an embodiment.

FIG. 5 illustrates a block diagram of an example of a network environment 500 for showing aspects of an intent-based ZFW policy model. In this example, the network environment 500 includes edge network devices 142A and 142B (collectively, 142), the Internet 160, a store network 502, a printer network 504, a technical services network 506, a guest Wi-Fi network 508, a Data Center (DC) network 510, and a DC technical services network 512. The Internet may be associated with IP addresses 174.11.1.2 and 10.0.0.12. The store network 502 may be associated with IP address 10.17.36.2. The printer network 504 may be associated with IP subnet 173.11.1.2/24. The technical services network 506 may be associated with IP subnet 173.11.2/24. The guest Wi-Fi network 508 may be associated with IP address 102.102.102.2. The DC network 510 may be associated with IP subnet 172.11.11.2/24. The DC technical services network 512 may be associated with IP subnet 172.11.12.2/24.

An operator of the network environment 500 may want to secure the network using stateful inspection of certain traffic (e.g., TCP, UDP, ICMP, etc.). For instance, the network operator may want to configure the network environment 500 to (i) enable the guest Wi-Fi network 508 to initiate traffic to the Internet 160 and permit return traffic but prohibit traffic between the guest Wi-Fi network 508 and other parts of the network environment 500, (ii) enable the store network 502 to initiate traffic to the printer network 504 and the DC network 510 and permit return traffic but prohibit traffic between the store network 502 and other parts of the network environment 500, (iii) prohibit the Internet 160, the printer network 504, the technical services network 506, and the DC network 510 from initiating traffic with other parts of the network environment 500, and (iv) enable the DC technical services network 512 to initiate traffic to the technical services network 506 and permit return traffic but prohibit traffic between the DC technical services network 512 and other parts of the network environment 500.

The above objectives are shown in FIG. 5 by the solid directional bold lines and the bolded dashed lines. The solid directional bold lines can represent traffic originating from the VPNs indicated by the directional arrows (e.g., the store network 502, the guest Wi-Fi network 508, and the DC technical services network 512) and the dashed bold lines can represent return traffic. The thin unbolded lines can represent physical connections between the networks 502-512 and the Internet 160.

To carry out the above objectives using a conventional zone-based policy model, an administrator or other user may be required to define several zones for the networks 502-512 and the Internet 160, specific zone-pairs for allowing the inter-zone communications discussed above, a first set of conventional ZFW policies in the first edge network device 142A and a second set of conventional ZFW policies in the second edge network device 142B to enable the above communications, a third set of conventional ZFW policies in the second edge network device 142B mirroring the first set of conventional ZFW policies and a fourth set of conventional ZFW policies in the second edge network device 142B mirroring the second set of conventional ZFW policies. In addition, the administrator or other user may be required to separately install the conventional ZFW policies onto specific interfaces of the first edge network device 142A and the second edge network device 142B.

Figure 6:
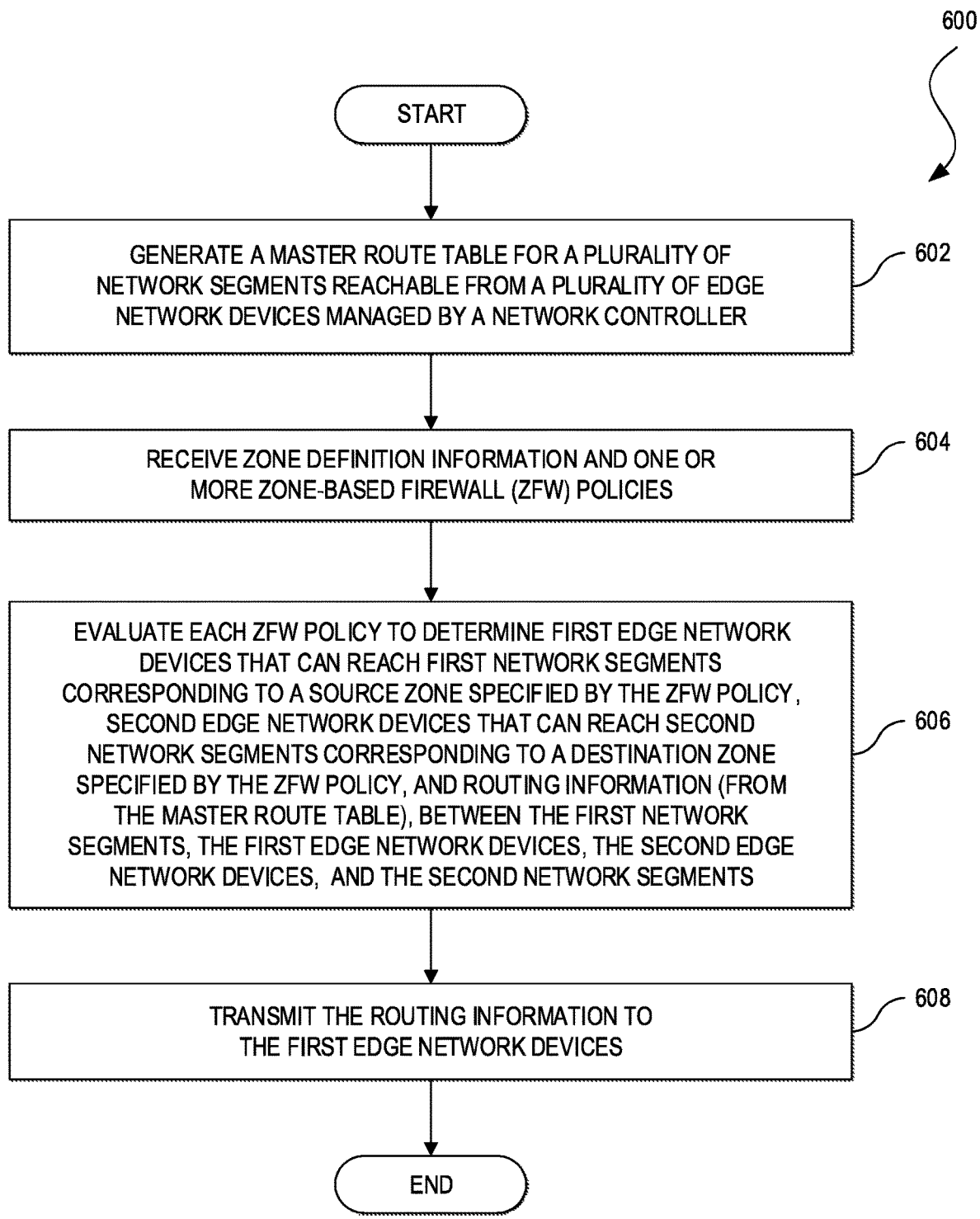

In various embodiments, an administrator or other user may instead configure an intent-based ZFW policy model, decoupled from interfaces, within a centralized network management system. FIG. 6 illustrates an example of a flow diagram of a process 600 for implementing the intent-based ZFW policy model. One of ordinary skill will understood that, for any processes discussed herein, there can be additional, fewer, or alternative steps performed in similar or alternative orders, or in parallel, within the scope of the various embodiments unless otherwise stated. The process 600 may be performed at least in part by the network orchestrator appliances 104, the network management appliances 122, the network controller appliances 132, and/or the edge network devices 142.

The process 600 may begin with step 602 in which a network controller (e.g., the network controller appliances 132) can generate a master route table for a plurality of network segments reachable from a plurality of edge network devices (e.g., the edge network devices 142) managed by the network controller. In some embodiments, the plurality of network segments can comprise VPNs. Other embodiments may alternatively or additionally segment the network using other intent-based segmentation approaches, such as network segments defined by route attributes (e.g., OMP route attributes, TLOC route attributes, etc.), packet header attributes (e.g., source address, source port, destination address, destination port, protocol, DSCP, etc.), identity-based attributes (e.g., user identifier, group, role, etc.), other types of virtual network segment (e.g., VLANs, VNIDs, VRFs, EPGs, etc.), location or network site identifier (e.g., campus, data center, branch, etc.), or other collections of network objects (e.g., users, devices, systems, applications, etc.).

OMP route attributes can include origin (e.g., source of the OMP route, such as BGP, OSPF, connected, and static, and the metric associated with the original route), originator (e.g., OMP identifier of the source of the route, such as the IP address from which the route was learned), preference (e.g., degree of preference for the OMP route in which a higher preference value can indicate the route is more preferred), service (network service associated with the OMP route), site identifier (e.g., identifier of a site within the overlay network domain to which the OMP route belongs), and tag (e.g., transitive path attribute that an OMP speaker can use to control the routing information it accepts, prefers, or redistributes), TLOC (e.g., used as the next hop for the OMP route and can include the system IP address of the OMP speaker that originates the OMP route, color to identify the link type, and encapsulation type on the transport tunnel), and VPN (e.g., VPN to which the OMP route belongs) or other type of virtual network segment, among others.

TLOC route attributes can include private IP address (e.g., the private IP address of the interface associated with the TLOC), public IP address (e.g., the NAT-translated address of the TLOC), carrier (e.g., an identifier of the carrier type which can indicate whether the transport is public or private), color (e.g., link type), encapsulation type (e.g., tunnel encapsulation type, such as IP Security (IPSec), Generic Routing Encapsulation (GRE), etc.), site identifier (e.g., identifier of a site within the overlay network domain to which the TLOC belongs), tag (e.g., transitive path attribute that an OMP speaker can use to control the flow of routing information toward a TLOC; when an OMP route is advertised along with its TLOC, both or either can be distributed with a community tag, to be used to decide how send traffic to or receive traffic from a group of TLOCs), weight (e.g., value used to discriminate among multiple entry points of an OMP route is reachable through two or more TLOCs), and so forth.

Generation of the master route table can begin with the edge network devices redistributing route-related prefixes that they learn from their local sites to the network controller. In some embodiments, this route information can be carried by OMP route advertisements that are sent over a DTLS connection (e.g., the DTLS connection 304) between the edge network devices and the network controller. If the network controller is distributed across multiple network controller appliances, the edge network devices can send OMP route advertisements to all of the network controller appliances.

In addition to OMP routes, the edge network devices can also send TLOC routes over OMP to the network controller or controllers in their domain. An edge network device may also send service routes over OMP to advertise network services (e.g., DDoS mitigation, load balancing, intrusion prevention, intrusion detection, WAN optimization, etc.) that are available at the local site where the edge network device is located. The network controller can accept the OMP, TLOC, and service routes that it receives from the edge network devices in its domain, and store the information in the master route table. The network controller can track which OMP routes, TLOCs, and services belong to which VPNs or other network segments. The network controller can use the routes to develop a topology map of the network and to determine routing paths for data traffic through the overlay network. The network controller can redistribute information learned from the OMP, TLOC, and service routes in a particular VPN or other network segment to the edge network devices in the same VPN or other network segment. The edge network devices can regularly send route updates to the network controller. The network controller can recalculate routing paths, update the master route table, and advertise new and changed routing information to the edge network devices. Although the network controller utilizes OMP for populating its master route table in this example, other embodiments may alternatively or additionally use other network protocols known to those of ordinary skill (e.g., BGP, OSPF, etc.).

At step 604, the network controller can receive zone definition information mapping the plurality of network segments into one or more zones and one or more ZFW policies to apply to traffic between a source zone and a destination zone specified by each ZFW policy. The zone definition information and the ZFW policies can make up the intent-based ZFW policy model. In some embodiments, the network can include a network management system (e.g., the network management appliances 122) having a user interface for receiving the zone definition information and the ZFW policies. An administrator or other user may provide the zone definition information and the ZFW policies via the user interface of the network management system, and the network management system can transmit the zone definition information and the ZFW policies to the network controller.

In some embodiments, the zone definition information can map each zone to one or more VPNs that are decoupled from the interfaces of the edge network devices. That is, the VPNs are not binded to specific interfaces of the edge network devices but can be determined by centralized control policies that set forth VPN membership. The VPN membership policies can control whether the edge network devices can participate in particular VPNs (e.g., define which VPNs the edge network devices can receive routes from). The VPN membership policies can be centralized because they may only affect packet headers and have no impact on the choice of interface that the edge network devices use to transmit traffic. Instead, the network controller can enforce the VPN membership policies by never forwarding routes to the edge network devices when the devices are prohibited from receiving routes from certain VPNs. In the example of FIG. 5, the store network 502, the printer network 504, the technical services network 506, the DC network 510, and the DC technical services network 512 can be members of VPN_1, the guest Wi-Fi network 508 can be a member of VPN_2, and the Internet 160 can be a member of VPN_3. VPN_1 can map to ZONE_1, VPN_2 can map to ZONE_2, and VPN_3 can map to ZONE_3.

Other embodiments may enable zones to be mapped to other collections of network objects that are decoupled from interfaces, such as zones mapped to route attributes, packet header attributes, packet payload attributes, other types of virtual network segments (e.g., VLANs, VNIDs, VRFs, EPGs, etc.), identity-based attributes, locations or network site identifiers, and other types of network segments.

ZFW policies can include a source zone, a destination zone, and a firewall policy. The source zone can comprise a grouping of one or more VPNs (or other network segments) from which data traffic flows originate. The destination zone can comprise a grouping of one or more VPNs (or other network segments) to which data traffic flows terminate. In some embodiments, a VPN (or other network segment) can belong to only one zone. The source zone and destination zone make up a zone pair that causes the firewall policy to be applied to the traffic that flows between the two zones.

The firewall policy is a security policy that can define the conditions that data traffic flows from the source zone to the destination zone match on and one or more actions to perform when the data traffic flows match the specified conditions. In some embodiments, the firewall policy can comprise a series of numbered or ordered sequences of match-action pairs that may be evaluated in order, from lowest sequence number to highest sequence number. When a data packet matches the match conditions, the associated action or actions may be taken and policy evaluation on that packet can stop. If a packet matches no conditions, a default action can be taken on the packet. The match conditions can provide more granular ZFW policies, and data packets can match on IP prefixes, IP ports, protocols (e.g., TCP, UDP, ICMP, etc.), applications, identities, groups, services, VPN identifiers or other network segment identifiers, and so forth. Matching flows can be processed by an inspect action, a pass action, a reject action, or a drop action. The inspect action can cause a packet header to be inspected and the packet header information (e.g., source address, source port, destination address, destination port, protocol, DSCP, etc.) stored in a connection or session table to permit return traffic. The pass action can allow a packet to pass to the destination zone without inspecting the packet's header. The reject action and drop action can prohibit certain traffic between zones. The reject action can result in transmission of error packets (e.g., via ICMP) to indicate the destination zone is unreachable while the drop action drops traffic without transmission of error packets.

In the example of FIG. 5, the default zone behavior can prohibit communications between zones, including members of the same zone, unless a ZFW policy is defined that explicitly allows a specific type of traffic. Thus, the network controller may not advertise or distribute a particular route to the edge network devices 142 unless a ZFW policy exists that permits traffic to flow along that route. To enable traffic to flow according to the network operator's intents discussed above, ZFW policies 520A, 520B, 520C, and 520D (collectively, 520) can be defined to override the default zone behavior. For example, the first ZFW policy 520A can enable traffic to be initiated from the guest Wi-Fi network 508 (e.g., VPN_2/ZONE_2) to the Internet 160 (e.g., VPN_3/ZONE_3) and to permit return traffic, the second ZFW policy 520B can enable traffic to be initiated from the store network 502 (e.g., VPN_1/ZONE_1) to the printer network 504 (e.g., VPN_1/ZONE_1) and to permit return traffic, the third ZFW policy 520C can enable traffic to be initiated from the store network 502 (e.g., VPN_1/ZONE_1) to the DC network 510 (e.g., VPN_1/ZONE_1) and to permit return traffic, and the fourth ZFW policy 520D can enable traffic to be initiated from the DC technical services network 512 (e.g., VPN_1/ZONE_1) to the technical services network 506 (e.g., VPN_1/ZONE_1) and to permit return traffic.

At step 606, the network controller can evaluate each ZFW policy 520 to determine the edge network devices (i.e., first edge network devices) that can reach the network segments (i.e., first network segments) mapped to the source zone specified by the ZFW policy, the edge network devices (i.e., second edge network devices) that can reach the network segments (i.e., second network segments) mapped to the destination zone specified by the ZFW policy, and routing information (from the master route table) between the first network segments, first edge network devices, second edge network devices, and the second network segments. For example, given a first ZFW policy, the network controller can determine the first edge network devices subscribed to the VPNs mapped to a first source zone specified by the ZFW policy (e.g., source VPNs) and the second edge network devices subscribed to the VPNs mapped to a first destination zone specified by the first ZFW policy (e.g., destination VPNs).

If the first ZFW policy does not specify any match action pairs, the network controller can determine the IP prefixes corresponding to the source VPNs (e.g., source prefixes) and the IP prefixes corresponding to the destination VPNs (e.g., destination prefixes). Then, the network controller can search the master route table for the routing information corresponding to each source-destination prefix pair among the source prefixes and destination prefixes. For instance, the network controller can evaluate the ZFW policy 520A to determine that only the first edge network device 142A is subscribed to the VPN (i.e., VPN_2) mapped to the source zone specified by the ZFW policy 520A (i.e., ZONE_2) and the VPN (i.e., VPN_3) mapped to the destination zone specified by the ZFW policy 520A (i.e., ZONE_3). Then, the network controller can search the master route table for the routing information between the IP prefixes of the source VPN (i.e., 102.102.102.2) and the IP prefixes of the destination VPN (i.e., 174.11.1.2). These routes can be denoted as A'. The action specified by the ZFW policy 520A is an inspect action. Thus, return traffic from the Internet 160 may be allowed if connection or session information exists for data traffic initiated from the guest Wi-Fi network 508 to the Internet 160. This can be achieved by the first edge network device 142A maintaining a connection or session table and populating the return route from the Internet 160 to the guest Wi-Fi network 508 when the guest Wi-Fi network 508 initiates data traffic to the Internet 160.

If the first ZFW policy specifies one or more match conditions, the network controller can determine the IP prefixes corresponding to the source match condition and the IP prefixes corresponding to the destination match condition. Then, the network controller can search the master route table for the routing information corresponding to each source-destination prefix pair among the source prefixes matching on the source match condition and destination prefixes matching on the destination match condition. For instance, the network controller can evaluate the ZFW policy 520C to determine that both the first edge network device 142A and the second edge network device 142B are subscribed to the VPN (i.e., VPN_1) mapped to the source zone specified by the ZFW policy 520C (i.e., Zone 1) and the VPN (i.e., VPN_1) mapped to the destination zone specified by the ZFW policy 520C (i.e., ZONE_1). Then, the network controller can search the master route table for routing information between the IP prefixes corresponding to the source match condition (i.e., IP address of the store network 502 or 10.17.36.2) and the IP prefixes corresponding to the destination match condition (i.e., IP subnet of the DC network 510 or 172.11.11.2/24). This routing information can be denoted as C'. The action specified by the ZFW policy 520C is an inspect action. Thus, return traffic from DC network 510 may be allowed if connection or session information exists for data traffic initiated from the store network 502 to the DC network 510. This can be achieved by the first edge network device 142A and/or the second edge network device 142B maintaining connection or session tables and populating return routing information from the DC network 510 to the store network 502 when the store network 502 initiates data traffic to the DC network 510. In another scenario, if the action specified by a ZFW policy is instead a pass action, then no connection or session information is maintained and there is no return routing information. A similar approach can be used to obtain the routing information B' for the ZFW policy 520B and the routing information D' for the ZFW policy 520D.

The process 600 can conclude with step 608 in which the network controller can transmit the routing information to the first edge network device 142A and the second edge network device 142B. In the example of FIG. 5, the network controller can transmit the routing information A' to the first edge network device 142A for the ZFW policy 520A. The network controller does not transmit the routing information A' to the second edge network device 142B because, for example, the second edge network device 142B may not subscribed to VPN_2 or VPN_3. For the ZFW policy 520B, the network controller can transmit routing information B' to the first edge network device 142A. The network controller does not transmit the routing information B' to the second edge network device 142B because, for example, the master route table does not include routing information between the IP prefixes corresponding to the source match condition (e.g., the store network 502) and the destination match condition (e.g., the printer network 504) through the second edge network device 142B. For the ZFW policy 520C, the network controller can transmit the routing information C' to the first edge network device 142A and the second edge network device 142B. For the ZFW policy 520D, the network controller can transmit routing information D' to the first edge network device and the second edge network device 142B.

The process 600 can simplify ZFW configuration in a number of ways. A user can configure a ZFW for the network environment 500 once from a centralized network management system. The user does not need to define mirror policies to ensure correct behavior for traffic spanning multiple edge network devices. ZFW policy can be dynamic. Zones can be created at any time but zone definition information and ZFW policies need not be configured until a zone member attaches to the network. ZFW policy can be mobile. Adding or removing a zone member to or from anywhere in the network would not require reconfiguration of policy.

The process 600 can improve utilization of computing resources (e.g., processing, memory, bandwidth, etc.). For example, network devices can conserve resources by not having to enforce ZFW policies that are not applicable to those network devices. In addition, network load can be decreased because policy is only processed once at the network controller instead of multiple times at each edge network device when traffic spans multiple network devices. Various other functions and advantages are described and suggested above as may be provided in accordance with the various embodiments.

FIG. 7 illustrates an example of a network device 700 (e.g., switch, router, network appliance, etc.). The network device 700 can include a master central processing unit (CPU) 702, interfaces 704, and a bus 706 (e.g., a Peripheral Component Interconnect (PCI) bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile Random Access Memory (RAM) and/or Read-Only Memory (ROM)) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8A:
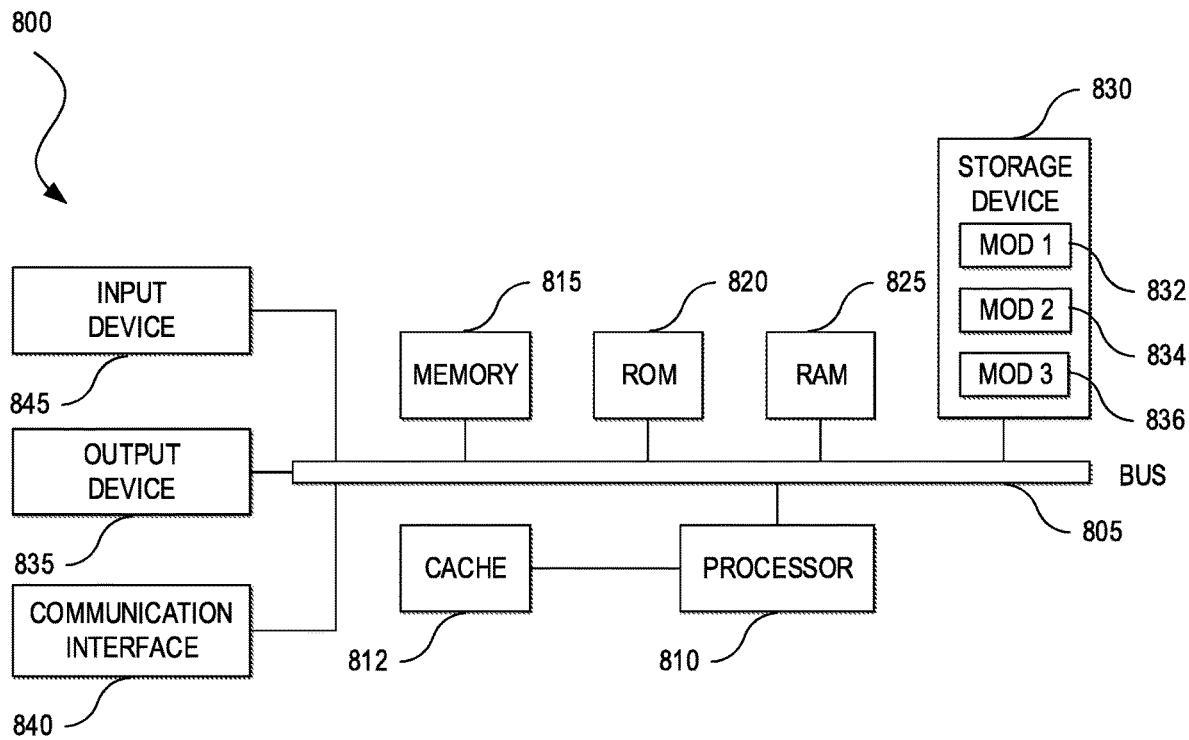
FIGS. 8A and 8B illustrate block diagrams of examples of computing systems in accordance with some embodiments.
Figure 8B:
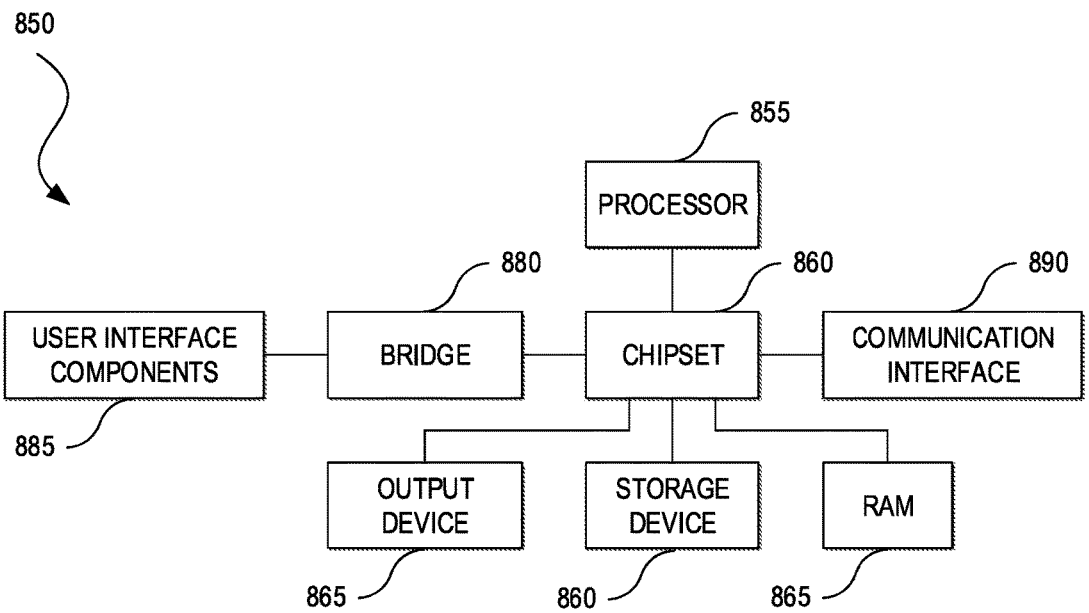

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:
receiving zone definition information mapping the plurality of network segments into one or more zones, and one or more zone-based firewall (ZFW) policies to apply to traffic between a source zone and a destination zone specified by each ZFW policy;
evaluating a first ZFW policy to determine one or more first edge network devices that can reach one or more first network segments mapped to a first source zone specified by the first ZFW policy, one or more second edge network devices that can reach one or more second network segments mapped to a first destination zone specified by the first ZFW policy, and first routing information between the one or more first network segments, the one or more first edge network devices, the one or more second edge network devices, and the one or more second network segments; and
transmitting the first routing information to the one or more first edge network devices and the one or more second edge network devices.

2. The computer-implemented method of claim 1, wherein the first ZFW policy includes an inspect action, and the method further comprising:
determining second routing information between the one or more second network segments, the one or more second edge network devices, the one or more first edge network devices, and the one or more first network segments; and
transmitting the second routing information to the one or more second edge network devices and the one or more first edge network devices in response to receiving traffic whose source corresponds to the one or more first network segments and whose destination corresponds to the one or more second network segments.

3. The computer-implemented method of claim 1, wherein the plurality of network segments comprises a plurality of Virtual Private Networks (VPNs), the zone definition information comprises information mapping the plurality of VPNs into the one or more zones, and each zone is unbinded to interfaces of the plurality of edge network devices.

4. The computer-implemented method of claim 1, wherein the plurality of network segments comprise at least one of a plurality of network objects sharing route attributes, a plurality of network objects sharing packet header attributes, a plurality of network objects sharing packet payload attributes, a plurality of network objects sharing identity information, a plurality of Virtual Local Area Networks (VLANs), a plurality of Virtual Network Identifiers (VNIDs), a plurality of Virtual Routing and Forwarding instances (VRFs), a plurality of Endpoint Groups (EPGs), or a plurality of network objects sharing a location or network site identifier; the zone definition information comprises information mapping at least one of the plurality of network objects sharing route attributes, the plurality of network objects sharing packet header attributes, the plurality of network objects sharing packet payload attributes, the plurality of network objects sharing identify information, the plurality of VLANs, the plurality of VNIDs, the plurality of VRFs, the plurality of EPGs, or the plurality of network objects sharing location or network site identifier information into the one or more zones; and each zone is unbinded to interfaces of the plurality of edge network devices.

5. The computer-implemented method of claim 1, wherein no network segment mapped to a third zone is reachable at a first time from the one or more first edge network devices, and the one or more first edge network devices exclude second routing information between any network segment mapped to the third zone and the one or more first edge network devices.

6. The computer-implemented method of claim 5, further comprising:
determining that one or more third network segments mapped to the third zone are reachable from the one or more first edge network devices at a second time;
evaluating a second ZFW policy to determine the one or more first edge network devices can reach the one or more third network segments and the third zone is a second source zone specified by the second ZFW policy, one or more third edge network devices that can reach one or more fourth network segments mapped to a second destination zone specified by the second ZFW policy, and third routing information between the one or more third network segments, the one or more first edge network devices, the one or more third edge network devices, and the one or more fourth network segments; and
transmitting the third routing information to the one or more first edge network devices and the one or more third edge network devices.

7. The computer-implemented method of claim 1, further comprising:
determining the one or more first network segments are no longer reachable from the one or more first edge network devices; and
removing the first routing information from the one or more first edge network devices.

8. The computer-implemented method of claim 7, further comprising:

determining the one or more first network segments are reachable from one or more third edge network devices;
evaluating the first ZFW policy to determine the one or more third edge network devices can reach the one or more first network segments, the one or more second edge network devices, and second routing information between the one or more first network segments, the one or more third edge network devices, the one or more second edge network devices, and the one or more second network segments; and
transmitting the second routing information to the one or more third edge network devices and the one or more second edge network devices.

9. The computer-implemented method of claim 1, further comprising:
receiving one or more updates to at least one of the zone definition information or the one or more ZFW policies;
determining that at least one first route of the first routing information is no longer available based on the one or more updates; and
removing the first route from the one or more first edge network devices.

10. The computer-implemented method of claim 1, further comprising:
determining one or more source prefixes corresponding to one or more source match conditions specified by the first ZFW policy;
determining one or more destination prefixes corresponding to one or more destination match conditions specified by the first ZFW policy; and
retrieving the first routing information based on the one or more source prefixes and the one or more destination prefixes.

11. The computer-implemented method of claim 10, further comprising:
retrieving second routing information based on the one or more destination prefixes and the one or more source prefixes; and
transmitting the second routing information to the one or more second edge network devices and the one or more first edge network devices in response to receiving traffic whose source corresponds to the source prefixes and whose destination corresponds to the one or more destination prefixes.

12. The computer-implemented method of claim 1, further comprising:
determining one or more source prefixes corresponding to one or more default source match conditions of the first ZFW policy;
determining one or more destination prefixes corresponding to one or more default destination match conditions of the first ZFW policy; and
retrieving the first routing information from based on the one or more source prefixes and the one or more destination prefixes.

13. A system, comprising:
one or more processors; and
memory including instructions that, when executed by the one or more processors, cause the system to:
receive zone definition information mapping the plurality of network segments into one or more zones, and one or more zone-based firewall (ZFW) policies to apply to traffic between a source zone and a destination zone specified by each ZFW policy;

evaluate a first ZFW policy to determine one or more first edge network devices that can reach one or more first network segments mapped to a first source zone specified by the first ZFW policy, one or more second edge network devices that can reach one or more second network segments mapped to a first destination zone specified by the first ZFW policy, and first routing information between the one or more first network segments, the one or more first edge network devices, the one or more second edge network devices, and the one or more second network segments; and transmit the first routing information to the one or more first edge network devices and the one or more second edge network devices.

14. The system of claim 13, wherein the plurality of network segments comprises a plurality of Virtual Private Networks (VPNs), the zone definition information comprises information mapping the plurality of VPNs into the one or more zones, and each zone is unbinded to interfaces of the plurality of edge network devices.

15. The system of claim 13, wherein the instructions when executed further cause the system to:
determine one or more third network segments mapped to a third zone are reachable from the one or more first edge network devices;
evaluate a second ZFW policy to determine the one or more first edge network devices can reach the one or more third network segments and the third zone is a second source zone specified by the second ZFW policy, one or more third edge network devices that can reach one or more fourth network segments mapped to a second destination zone specified by the second ZFW policy, and third routing information between the one or more third network segments, the one or more first edge network devices, the one or more third edge network devices, and the one or more fourth network segments; and
transmit the third routing information to the one or more first edge network devices and the one or more third edge network devices.

16. The system of claim 13, wherein the instructions when executed further cause the system to:
determine the one or more first network segments are no longer reachable from the one or more first edge network devices;
remove the first routing information from the one or more first edge network devices;
determine the one or more first network segments are reachable from one or more third edge network devices;
evaluate the first ZFW policy to determine the one or more third edge network devices can reach the one or more first network segments, the one or more second edge network devices, and second routing information between the one or more first network segments, the one or more third edge network devices, the one or more second edge network devices, and the one or more second network segments; and
transmit the second routing information to the one or more third edge network devices and the one or more second edge network devices.

17. A non-transitory computer-readable storage medium including instructions that, upon being executed by one or more processors of a system, cause the system to:
receive zone definition information mapping the plurality of network segments into one or more zones, and one or more zone-based firewall (ZFW) policies to apply to traffic between a source zone and a destination zone specified by each ZFW policy;
evaluate a first ZFW policy to determine one or more first edge network devices that can reach one or more first network segments mapped to a first source zone specified by the first ZFW policy, one or more second edge network devices that can reach one or more second network segments mapped to a first destination zone specified by the first ZFW policy, and first routing information between the one or more first network segments, the one or more first edge network devices, the one or more second edge network devices, and the one or more second network segments; and
transmit the first routing information to the one or more first edge network devices and the one or more second edge network devices.

18. The non-transitory computer-readable storage medium of claim 17, wherein the plurality of network segments comprise at least one of a plurality of network objects sharing route attributes, a plurality of network objects sharing packet header attributes, a plurality of network objects sharing packet payload attributes, a plurality of network objects sharing identity information, a plurality of Virtual Local Area Networks (VLANs), a plurality of Virtual Network Identifiers (VNIDs), a plurality of Virtual Routing and Forwarding instances (VRFs), a plurality of Endpoint Groups (EPGs), or a plurality of network objects sharing a location or network site identifier; the zone definition information comprises information mapping at least one of the plurality of network objects sharing route attributes, the plurality of network objects sharing packet header attributes, the plurality of network objects sharing packet payload attributes, the plurality of network objects sharing identify information, the plurality of VLANs, the plurality of VNIDs, the plurality of VRFs, the plurality of EPGs, or the plurality of network objects sharing location or network site identifier information into the one or more zones; and each zone is unbinded to interfaces of the plurality of edge network devices.

19. The non-transitory computer-readable storage medium of claim 17, wherein the instructions when executed further cause the system to:
receive one or more updates to at least one of the zone definition information or the one or more ZFW policies;
determine that at least one first route of the first routing information is no longer available based on the one or more updates; and
remove the first route from the one or more first edge network devices.

20. The non-transitory computer-readable storage medium of claim 17, wherein the instructions when executed further cause the system to:
determine one or more source prefixes corresponding to one or more source match conditions specified by the first ZFW policy;
determine one or more destination prefixes corresponding to one or more destination match conditions specified by the first ZFW policy;
retrieve the first routing information between the one or more source prefixes and the one or more destination prefixes;
retrieve second routing information between the one or more destination prefixes and the one or more source prefixes; and transmit the second routing information to the one or more second edge network devices and the one or more first edge network devices in response to receiving traffic whose source corresponds to the source prefixes and whose destination corresponds to the one or more destination prefixes.

\* \* \* \* \*